US007431904B2

(12) United States Patent
Høj et al.

(10) Patent No.: US 7,431,904 B2
(45) Date of Patent: Oct. 7, 2008

(54) CATALYST SUPPORT MATERIAL, CATALYSTS PREPARED THEREFROM AND PROCESS FOR THE TREATMENT OF A FLUE GAS

(75) Inventors: Jakob Weiland Høj, Gentofte (DK); Claus S. Jørgensen, Virum (DK)

(73) Assignee: Haldor Topsoe A/S, Lyngby (DK)

( * ) Notice: Subject to any disclaimer, the term of this patent is extended or adjusted under 35 U.S.C. 154(b) by 446 days.

(21) Appl. No.: 10/963,580

(22) Filed: Oct. 14, 2004

(65) Prior Publication Data
US 2005/0085383 A1     Apr. 21, 2005

(30) Foreign Application Priority Data
Oct. 15, 2003  (DK)  ............... 2003 01519

(51) Int. Cl.
| | |
|---|---|
| B01D 53/46 | (2006.01) |
| B01D 53/50 | (2006.01) |
| B01D 53/56 | (2006.01) |
| B01D 53/60 | (2006.01) |
| B01D 53/70 | (2006.01) |
| B01D 53/72 | (2006.01) |
| B01J 23/20 | (2006.01) |
| B01J 23/22 | (2006.01) |
| B01J 23/28 | (2006.01) |
| B01J 23/30 | (2006.01) |
| B01J 23/34 | (2006.01) |
| B01J 23/42 | (2006.01) |
| B01J 23/44 | (2006.01) |

(52) U.S. Cl. ............... 423/210; 423/239.1; 423/244.02; 423/245.1; 423/240 S; 502/217; 502/309; 502/324; 502/331; 502/337; 502/338; 502/339

(58) Field of Classification Search ......... 423/210–248; 502/439
See application file for complete search history.

(56) References Cited

U.S. PATENT DOCUMENTS

| | | | |
|---|---|---|---|
| 4,284,530 A | 8/1981 | Sherif | |
| 4,293,445 A * | 10/1981 | Shimizu et al. | ............. 502/200 |
| 4,321,224 A | 3/1982 | Shimizu et al. | |
| 4,350,670 A | 9/1982 | Matsuda et al. | |
| 4,378,338 A * | 3/1983 | Imanari et al. | ........... 423/239.1 |
| 4,497,902 A * | 2/1985 | Bertolacini et al. | ........... 502/65 |
| 4,593,014 A * | 6/1986 | Halluin et al. | ............. 502/242 |
| 4,929,586 A | 5/1990 | Hegedus et al. | |
| 5,175,136 A | 12/1992 | Felthouse | |
| 5,198,403 A | 3/1993 | Brand et al. | |
| 5,215,953 A | 6/1993 | Blumrich et al. | |
| 5,276,250 A | 1/1994 | Hagenmaier et al. | |
| 5,387,734 A | 2/1995 | Hagenmaier et al. | |
| 5,391,530 A | 2/1995 | Nowitzki et al. | |
| 5,420,085 A | 5/1995 | Newkirk et al. | |
| 5,451,557 A * | 9/1995 | Sherif | ........................ 502/177 |
| 5,512,259 A | 4/1996 | Hagenmaier et al. | |
| 5,571,763 A | 11/1996 | Takemoto et al. | |
| 6,509,293 B1 * | 1/2003 | Zoeller et al. | ............... 502/344 |
| 6,571,420 B1 | 6/2003 | Healy et al. | |
| 6,616,905 B1 | 9/2003 | Kawamura et al. | |

FOREIGN PATENT DOCUMENTS

| | | |
|---|---|---|
| EP | 0275 620 | 7/1988 |
| GB | 1 488 767 | 10/1977 |
| JP | 52036118 | 3/1977 |
| JP | 8-266897 | * 10/1996 |
| WO | WO 99/43195 | 9/1999 |

OTHER PUBLICATIONS

D.H. Scott, "Ash Behavior During Combustion and Gasification", IEA Coal Research 1999, Nov. 1999.
E.F. Sverdrup et al., "Control of Fan Erosion in Coal-Fired Power Plants", Westinghouse Research Laboratories, Aug. 1981.
D. Scott, "Ash-Impaction Wear Measurements and Erosion-Propensity Classification", CCC/24, IEA Coal Research 1999, ISBN 92-9029-334-9, no month.
E. Raask, "Erosion Wear in Coal Utilization", Hemisphere Publishing Corp., 1988, no month.

* cited by examiner

*Primary Examiner*—Wayne Langel
(74) *Attorney, Agent, or Firm*—Dickstein Shapiro LLP

(57) ABSTRACT

The present invention relates to a catalyst support material and catalysts made therefrom having improved resistance towards erosion.

The catalyst support contains at least 20% by weight of $TiO_2$ being present mainly in the anatase form. Furthermore, the catalyst support contains diatomaceous earth in an amount of at least 2% and less than 80% by weight of the catalyst support.

In one embodiment catalysts made from said catalyst support contain oxides or sulfates of base metals from the group of V, W, Mn, Nb, Mo, Ni, Fe or Cu. Another option is a catalyst prepared from said catalyst support containing Pt or Pd.

Said catalysts are used for treatment of a flue gas. More specifically the catalyst supports prepared according to the present invention and showing improved resistance towards erosion are used in flue gas containing a large amount of particulate matter and for selective catalytic reduction of nitrous oxides.

5 Claims, No Drawings

CATALYST SUPPORT MATERIAL, CATALYSTS PREPARED THEREFROM AND PROCESS FOR THE TREATMENT OF A FLUE GAS

BACKGROUND OF THE INVENTION

The invention relates to catalytic treatment of a flue gas. More particularly it relates to an improved catalyst support material, catalysts made therefrom and processes using such catalyst support material.

DESCRIPTION OF THE PRIOR ART

Flue gases from different sources, e.g. boilers in power plants, chemical process units, heat sections for steam reformers, gas or oil-fired engines or cement kilns contain a number of environmentally problematic or even poisonous compounds. These comprise nitrous oxides ($NO_x$), sulfur oxides ($SO_x$), dioxin, fluorocarbons and Hg compounds.

Catalytic cleaning of the flue gas reduces the amount of some of these compounds and is therefore beneficial for the environment in general. In certain areas legislation requires reduction of these compounds in the flue gas.

In Selective Catalytic Reduction (SCR) of $NO_x$, nitrous oxide compounds are selectively reduced to harmless nitrogen and water by reaction with a reduction agent, e.g. ammonia, over a catalyst:

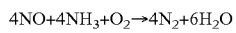

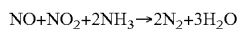

In a coal-fired power plant a SCR catalyst is typically installed downstream of the economizer section and upstream of the air-preheater and dust filters, e.g. electrostatic precipitator. The installation in other applications depends on the optimal operating temperature and the specific process layout. The operating temperature of a SCR catalyst is typically in the range of 200° C. to 500° C.

SCR catalysts are also known to reduce the amount of dioxin in flue gas from e.g. waste fired boilers. U.S. Pat. No. 5,512,259, which is incorporated herein by reference, discloses a method of reducing dioxin emissions from an off-gas using well-known Denox catalysts under oxidative conditions. The metals that are catalytically active for the Denox reaction are also suitable for degrading dioxin. Catalysts based on tungsten, vanadium, titanium and molybdenum are mentioned. U.S. Pat. Nos. 5,387,734 and 5,276,250, both of which are incorporated herein by reference, disclose catalysts suitable for dioxin degradation.

Certain types of flue gases contain a large fraction of suspended solids i.e. dust or soot. These typically come from coal-fired boilers, bio-mass fired boilers, co-combustion boilers or cement-kilns. The solids loading of a high-dust flue gas is typically 2 to 100 g/Nm³.

These solids are ash or fly-ash particles, which result from unburnt inorganic substances in the fuel, e.g. coal for a boiler. The amount of fly ash ranges from 5% to 30% of coal burned in a coal-fired boiler [U.S. Pat. No. 6,571,420 B1]. The composition of fly ash depends among other things on the type of fuel, e.g. coal. Usually it will mainly be a mixture of oxides and sulfates of Si, Al, Fe, Ca, Mg and alkali metals.

The fly ash particles can have a wide particle size distribution. The number distribution may be dominated by fine particles (<10 μm) while they only account for 1% to 5% on the mass basis [David H Scott: Ash behaviour during combustion and gasification, CCC/24, IEA Coal Research, 1999, ISBN 92-9029-334-9]. The median particle size can be from ten to several hundreds of microns and the size of particles entering a catalytic reactor, e.g. a SCR reactor, can range from 0.01 mm to 3 mm in diameter [U.S. Pat. No. 6,571,420 B1].

Such solid particles will be collected onto the surface of a catalyst placed in the stream of such flue gas. Therefore, it is advantageous to use monolithic (honeycomb, corrugated or plate-type) catalysts rather than packed bed catalysts for applications with a large amount of suspended solids in the flue gas, i.e. high dust applications. Monolithic catalysts have a plurality of essentially straight channels being holes in honeycombs or corrugated structures, or slots in plate-type catalysts [e.g. U.S. Pat. No. 6,571,420 B1]. Such catalyst design is useful for treatment of flue gas with large flow rates and for processes that do not tolerate a large pressure drop over the catalytic bed.

When fly ash is collected on the catalyst front surface and in the channels, the pressure drop over the reactor will increase. Therefore, the ash or dust should be removed in frequent intervals, e.g. by use of soot or dust blowers which swirl the dust deposited on the approach side of the catalysts by means of hot vapor or hot air [U.S. Pat. No. 5,215,953].

The fly ash particles are streaming through the catalyst channels and cause erosion, and thus, degradation of the catalyst material [U.S. Pat. No. 6,616,905 and U.S. Pat. No. 5,391,530]. The erosion rate depends on the composition of the fly ash, on the size distribution and on the gas velocity. For example, a high content of quartz $SiO_2$ in the fly ash results in a high erosion propensity [Sverdrup et al., Control of fan erosion in coal-fired power plants: Phase 1, Westinghouse research laboratories, 1981]. Also, larger particles generally have a greater erosion propensity [E. Raask, Erosion wear in coal utilization, Hemisphere Publishing Corporation, 1988].

Lowering the porosity of a material increases its strength and therefore also the resistance towards erosion [W. D. Kingery, Introduction to Ceramics, Wiley-Interscience, 1976].

Catalytic reduction of $NO_x$ on e.g. $V_2O_5$ based catalysts is diffusion limited. Therefore, a reduction in porosity of a catalyst material catalyst support material will lower the $NO_x$ reduction performance of a catalyst body.

U.S. Pat. No. 5,391,530 discloses that dipping the front edge of extruded $TiO_2/V_2O_5/WO_3$ SCR honeycombs into a solution of aluminium phosphate followed by a thermal treatment increases the resistance towards erosion.

Alternatively, hard, inorganic fillers may be used as part of the catalyst support material to increase erosion resistance. For example, U.S. Pat. No. 5,420,085 discloses addition of hard SiC particles to Al-nitride ceramic composite articles to improve their erosion resistance. Such additives or fillers may be termed "structural promoters" for the catalyst support.

U.S. Pat. No. 4,929,586 discloses a $NO_x$ SCR catalyst containing synthetic silica as either gel or precipitated onto which $TiO_2$ is precipitated. No properties regarding erosion resistance are noted.

U.S. Pat. No. 5,198,403 discloses an extruded SCR catalyst support containing anatase $TiO_2$ as well as glass fibres (10% of the $TiO_2$ weight, 1-8 mm long) and alkali free clay (4% of the $TiO_2$ weight). No strength or erosion properties were mentioned, but it is well known that fibres can improve strength and toughness of a porous ceramic structure.

Diatomaceous earth finds use as filler (extender) for paints and as porous material in catalysts. For example, U.S. Pat. No. 4,284,530 discloses a $SO_2$ oxidation catalyst containing at least 85% by weight of diatomaceous earth.

Diatomaceous earth can have many forms but certain types are preferred since they contain a low amount of crystalline quartz, which is known to cause health problems when inhaled as well as low amounts of impurities as iron oxides or alkali compounds, which can be poisons for the catalyst.

It is an objective of the present invention to identify means of obtaining improved resistance to wear or erosion of a catalyst support material as well as a high catalytic activity of catalysts made therefrom. Thereby said catalysts will perform better in processes where they are exposed to flue gases since they will have an improved lifetime.

SUMMARY OF THE INVENTION

The present invention relates to improvement of catalyst lifetime with respect to erosion resistance.

It has been found that addition of diatomaceous earth to a $TiO_2$ (anatase) based catalyst support results in an improved resistance towards erosion. Furthermore, catalyst supports improved by addition of diatomaceous earth retain a good catalytic performance demonstrated by an example with selective reduction of NO by $NH_3$.

Such catalyst supports are well suited for use for treatment of flue gases, more specifically flue gases with a high content of suspended solid particles.

DETAILED DESCRIPTION OF PREFERRED EMBODIMENTS

The present invention relates to improvement of erosion resistance of catalyst supports in general, more specifically by replacing part of the high surface area carrier material with a filler material as a structural promoter prior to shaping said catalyst support.

Common filler materials for improvement of erosion resistance comprise, among others, milled glass fibres, ground minerals as quartz ($SiO_2$), rutile ($TiO_2$), calcite ($CaCO_3$), corundum ($Al_2O_3$) and kaolinite $Al_2O_3 \cdot SiO_2(OH)_4$.

Five materials selected from the group of common filler materials as well as diatomaceous earth as replacement for anatase $TiO_2$ in SCR catalyst support are tested as an illustrative example. The catalyst support components are mixed to form a slurry which is coated onto a glass-fibre mat to form a plate shaped catalyst support after drying and calcination.

$TiO_2$ is preferably in the crystalline form of anatase and should have a specific surface area above 40 $m^2/g$. Solvents for said slurries may be water or a mixture of organic solvents (alcohols, alifatic or aromatic solvents) depending on the binder solubility. Binders may be soluble in water (e.g. PVA, PEG) or organic solvents (e.g. PVP, resins) and serve as rheology modifiers as well as binders after evaporation of solvents. Low viscosity slurries may be shaped to catalyst supports by dip-coating of a pre-shaped structure, i.e. a washcoat. Concentrated slurries or pastes may be shaped to catalyst support by extrusion or calendering into metal wire mesh or glass fibre paper.

The best material for replacement of $TiO_2$ with respect to improvement of the erosion resistance is shown to be diatomaceous earth. The amount of diatomaceous earth should be at least 2% by weight and less than 80% by weight of the catalyst support material. At too high amounts of diatomaceous earth the catalyst loses a significant part of the catalytic activity.

In one preferred embodiment said catalyst support material is shaped as monolithic honeycomb, corrugated honeycomb or plate-type catalyst support.

While the examples below illustrate the properties of specific embodiments, the invention is not limited to these, which is apparent to those skilled in the art. For example, the monolithic catalysts can be shaped by different methods such as washcoating a corrugated fibre structure by extrusion or by coating a kneadable paste onto a metal mesh. Also, the material mixture to be shaped may contain the actual catalytic components or their precursors.

In one preferred embodiment catalysts are prepared from said catalyst support material and contain oxides or sulphates of base metals from the group V, W, Mn, Nb, Mo, Ni, Fe and Cu. Such catalysts are suited for selective reduction of nitrous oxides with e.g. ammonia or for oxidation of CO or hydrocarbons. In other embodiment catalysts containing noble metals as Pt and Pd are prepared from said catalyst support material. Such catalysts are suited for oxidation of $SO_2$, CO or hydrocarbons in a flue gas.

Catalysts having either of these compositions are well suited for treatment of flue gases. In one preferred embodiment said catalyst support is shaped in the form of a monolithic structure having a plurality of channels and is used in applications with high flow gas rates (>0.5 Nm/s at temperatures above 250° C.) and high amounts of particulate mater (>2 g/$Nm^3$).

In yet another preferred embodiment said catalyst support is used for selective catalytic reduction of nitrous oxides.

Another embodiment relates to reduction of the concentration of dioxin in a flue gas.

EXAMPLES

Example 1

Reference Example 900 g anatase $TiO_2$ powder was suspended in 1100 g of a solution of tetra-isopropyl-titanate in butanol containing 4% by weight of Ti and 4% by weight of water. This slurry was mixed thoroughly in a laboratory dissolver in order to secure intimate mixture of the constituents and to break down any agglomerate to be smaller than 400 mesh. An Erichsen Grindometer was used to control this. Glass fibre mats having a thickness of approximately 1 mm were cut to dimensions of approximately 18 by 5 cm. These mats were dipped into the above mentioned slurry to obtain a fully wetted fibre mat. After drying, the material was calcined at 600° C. for 2 hours.

After calcination, the catalyst support material was impregnated with solutions made from $NH_4VO_3$ and $(NH_4)_6H_2W_{12}O_{40}$ and treated at 400° C. in air to give a final catalyst containing 1 wt % $V_2O_5$ and 7 wt % $WO_3$.

Example 2

Several ingredients were tested to improve attrition strength of the catalyst support material. The structural promoters tested comprise:

Rutile $TiO_2$: 200 mesh (M. O. Knudsen's Eftf., Denmark),
Quartz $SiO_2$: Type G 140 mesh (M. O. Knudsen's Eftf., Denmark),
Glass fibres Type 1: Milled FG400/030 (Schwartzwalder Textile Werke, Germany),
Glass fibres Type 2: Milled Microglass 3082 (Fibertech, USA),
Kaolinite: Supreme (ECC International, UK),
Diatomaceous earth: Celite 221M (Celite Corporation, U.S.A.).

The preparation procedure was as described in Example 1, but part of the anatase $TiO_2$ powder was replaced by the different additives. The amount of replacement of anatase $TiO_2$ with the structural promoters is given in Table 1.

TABLE 1

| Structural Promoter | Amount (Wt %) |
|---|---|
| Rutile | 10 |
| Quartz | 10 |
| Glass fibre type 1 | 5 |
| Glass fibre type 1 | 7.5 |
| Glass fibre type 1 | 15 |
| Glass fibre type 1 | 30 |
| Glass fibre type 2 | 30 |
| Glass fibre type 1 + Rutile | 30 + 10 |
| Kaolinite | 20 |
| Diatomaceous earth | 10 |
| Diatomaceous earth | 10 |
| Diatomaceous earth | 20 |
| Diatomaceous earth | 90 |
| Diatomaceous earth | 100 |

After calcination, the catalyst support material samples were impregnated with solutions made from $NH_4VO_3$ and $(NH_4)_6H_2W_{12}O_{40}$ and further treated at 400° C. in air to give final catalysts containing 1 wt % $V_2O_5$ and 7 wt % $WO_3$.

Example 3

Erosion Test

The term sample refers to an impregnated and calcined catalyst plate prepared according to Examples 1 and 2. The test samples were first dried to constant weight in a furnace at 150° C. for 30 minutes and subsequently cooled in an air-tight container. After cooling sample and sample holder were weighed with a precision of at least 1 mg.

Sample and holder were then placed inside a steel tube containing a distributor for steel powder. The angle of the test specimen was 22° from vertical. Steel powder (SS230, average particle diameter of approximately 0.5 mm) was poured onto the distributor plate wherefrom it drops onto the sample. After test the amount of steel sand used for the test as well as the sample were weighed. The above mentioned procedure was repeated three times for catalyst composition.

The attrition loss is given by the average weight loss of catalyst material per kg of steel powder. The results are given in Table 2. It is seen that the most efficient additive as replacement for $TiO_2$ is diatomaceous earth to reduce attrition loss.

TABLE 2

| Structural Promoter | Amount Wt % | Attrition loss Relative to reference (%) |
|---|---|---|
| Reference | 0 | 100 |
| Rutile | 10 | 62.5 |
| Quartz | 10 | 70.4 |
| Glass fibre type 1 | 5 | 51.1 |
| Glass fibre type 1 | 7.5 | 62.5 |
| Glass fibre type 1 | 15 | 36.4 |
| Glass fibre type 1 | 30 | 26.1 |
| Glass fibre type 2 | 30 | 15.9 |
| Glass fibre type 1 + Rutile | 30 + 10 | 20.5 |
| Kaolinite | 20 | 69.3 |
| Diatomaceous earth | 10 | 11.4 |
| Diatomaceous earth | 20 | 2.3 |
| Diatomaceous earth | 90 | 5.7 |
| Diatomaceous earth | 100 | 25.0 |

Example 4

Catalytic Testing

Small test pieces were cut from the samples prepared as described in Examples 1 and 2. Four of these test pieces were placed in a tubular reactor for catalytic testing. The total exposed area test was approximately 30 cm² for each test. Catalytic testing was performed at 350° C. with a gas having the composition given in Table 3 at the reactor inlet. The area normalized space velocity, NHAV, was approximately 70 Nm³/m²/hr in all cases.

TABLE 3

| Component | Concentration |
|---|---|
| NO | 500 ppm |
| $NH_3$ | 575 ppm |
| $SO_2$ | 980 ppm |
| $O_2$ | 3.9% |
| $H_2O$ | 4.8% |
| $N_2$ | balance |

The NO removal activity in the reactor is defined by:

$$\text{Activity} = -NHAV \cdot \ln(1 - X_{NO}), \text{ where } X_{NO} \text{ is the NO conversion in the reactor.}$$

The NO removal activity of the reference sample prepared as described in Example 1 was 53.5 Nm/hr. The NO removal activity of the samples prepared according to Example 2 is given in Table 4. All reinforced catalyst supports are effective for catalytic reduction of NO after impregnation, although there is a penalty of reinforcement on the catalytic activity.

For catalysts showing a low attrition loss, diatomaceous earth as structural promoter results in the lowest drop in catalytic activity and is therefore the most efficient replacement for $TiO_2$ in such catalysts.

TABLE 4

| Structural Promoter | Amount (wt %) | NO removal Activity (Nm/hr) |
|---|---|---|
| None (reference) | 0 | 53.5 |
| Rutile | 10 | 43.3 |
| Quartz | 10 | 51.2 |
| Glass fibre type 1 | 5 | 53.3 |
| Glass fibre type 1 | 7.5 | 54.1 |
| Glass fibre type 1 | 15 | 53.0 |
| Glass fibre type 1 | 30 | 52.0 |
| Glass fibre type 2 | 30 | 44.7 |
| Glass fibre type 1 + Rutile | 30 + 10 | 51.1 |
| Kaolinite | 20 | 49.4 |
| Diatomaceous earth | 10 | 52.4 |
| Diatomaceous earth | 20 | 45.1 |
| Diatomaceous earth | 90 | 33.8 |
| Diatomaceous earth | 100 | 30.9 |

The invention claimed is:

1. A process for treatment of a flue gas comprising the steps of:
    providing a catalyst comprising a catalyst support material, and Pt or Pd or at least one oxide or sulphate of base metals selected from the group consisting of V, W, Mn, Nb, Mo, Ni, Fe and Cu; wherein the catalyst support material consists of $TiO_2$ mainly in the form of anatase in an amount of at least 20% by weight, and diatomaceous earth in an amount of at least 2% and less than 80% by weight; and
    contacting the flue gas with the catalyst under conversion conditions in a catalytic reactor.

2. A process according to claim 1, characterised by contacting the catalyst with a solid particle containing flue gas.

3. A process according to claim 2, characterised by contacting the catalyst with a flue gas having a solid particle content higher than 2 g/Nm³ flue gas.

4. A process according to claim 3, characterised by contacting the flue gas at conversion conditions of a temperature in the range of 200° C. to 500° C. and a superficial gas velocity into the catalytic reactor in the range of 0.5 to 5 Nm/s.

5. A process according to claim 1, characterised by being catalytic selective reduction of nitrous oxide and/or dioxin.

* * * * *